Inventor:
Andrew Jackson Stone
By Brown, Jackson, Boettcher & Dienner
Attys

Jan. 5, 1943. A. J. STONE 2,307,548
REFRIGERATING APPARATUS
Filed Dec. 28, 1940 2 Sheets-Sheet 2

Inventor:
Andrew Jackson Stone
By Brown, Jackson, Boettcher & Dienner
Attys

UNITED STATES PATENT OFFICE 2,307,548

REFRIGERATING APPARATUS

Andrew Jackson Stone, Boston, Mass.

Application December 28, 1940, Serial No. 372,033

13 Claims. (Cl. 62—114)

My invention relates to refrigerating apparatus, and has particular reference to apparatus adapted for the quick freezing of vegetables, meats, fish, and fowl, whole or in prepared form, packaged or unpackaged, wrapped or unwrapped.

The apparatus consists essentially of a thermally insulated housing having in its a rotatable drum providing freezing compartments between refrigerated surfaces, the arrangement being such that the articles are introduced into the freezing compartments successively as such compartments reach a given position in the rotation of the drum, remain there long enough to be frozen, and are removed, frozen, as such compartments reach a given position in the rotation of the drum, preferably the same position at which they were introduced.

Reference is had to the accompanying drawings, in which.

Figure 1:
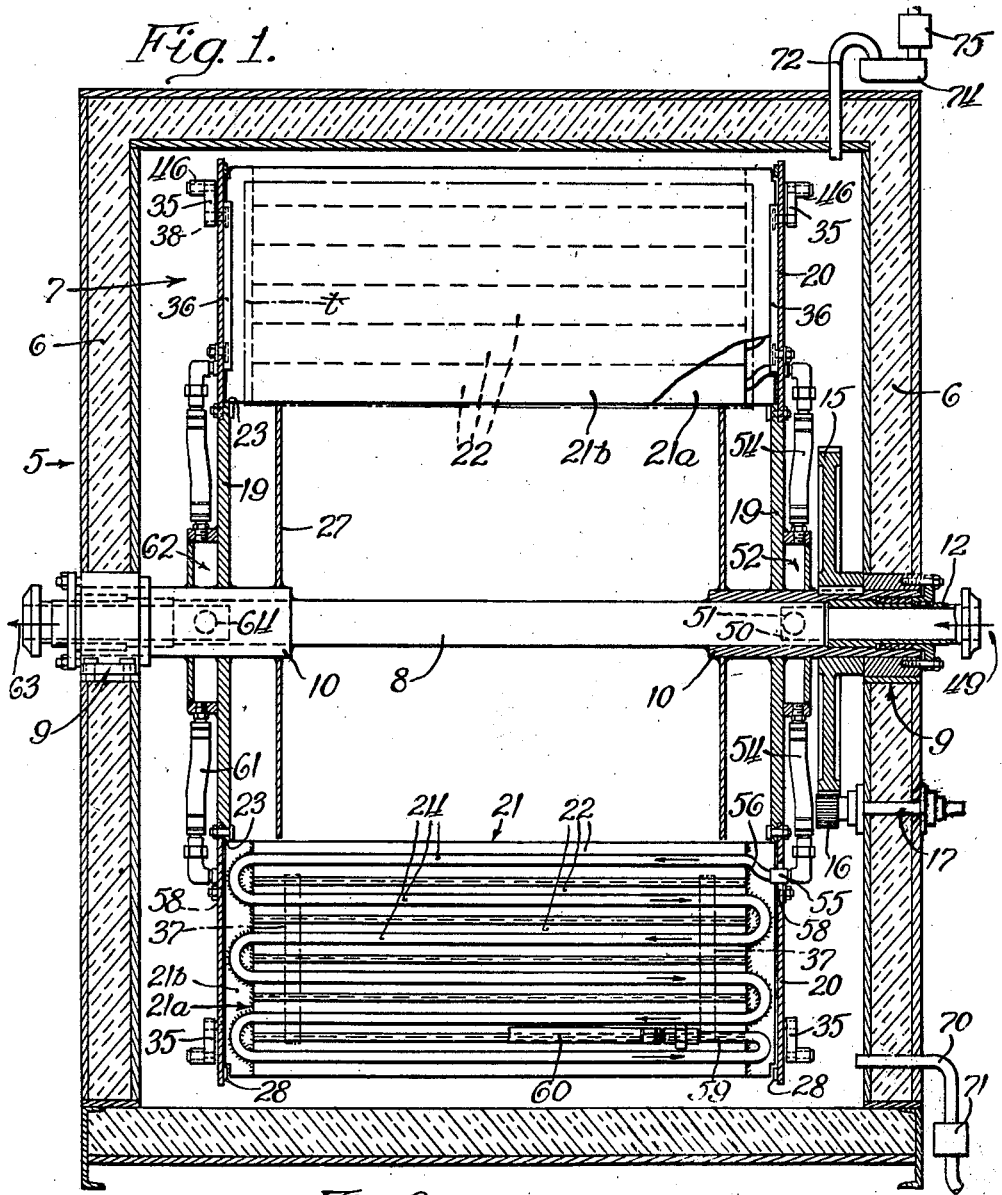
Figure 1 is an axial vertical sectional view of the machine of my invention.

Referring now in detail to the drawings, the freezing apparatus has a thermally insulated housing 5. A drum, indicated in its entirety by the numeral 7, is rotatably mounted within the housing by means of a shaft 8 and trunnion sleeves 10, 10, mounted on the opposite ends thereof and welded thereto, the trunnion sleeves 10, 10, in turn, being mounted in bearings 9, 9 in the opposite side walls 6, 6. At each end of the shaft 8, fitting within the corresponding trunnion sleeve 10, is a tubular member 12, which is stationary and which extends out beyond the corresponding side wall 6.

A gear wheel 15 is mounted on the sleeve 10 and is keyed thereto, a pinion 16 on the shaft 17 meshing therewith. The shaft 17 may be operated by hand or by any suitable power means to rotate the drum.

The drum comprises disc-like end plates 19, 19, welded to the sleeves 10, 10, and annular plates 20, 20, bolted to the plates 19, 19, at the peripheries thereof. Mounted between the annular plates 20, 20, and radiating from the axis of the drum, are a plurality of pairs of refrigerated walls 21, 21, which form freezing compartments 31 into which the articles to be frozen are inserted.

The walls 21 are retained between the plates 20, 20, and between shoulders 23 of the end plates 19, 19, and stop brackets 28 which retain the walls in radially spaced position. In the space 32 (Figure 2), between the pairs of walls 21, there are disposed leaf springs 37 normally holding the walls against the bars 36 which bear upon each other and on the inner faces of walls 21 for a purpose to be described presently. The bars 36 are secured to levers 34 which in turn are secured on studs 38 pivoted to the annular plates 20, 20, by which it will be seen that the walls 21 of each pair are retained by bars 36 in circumferentially spaced positions.

Figure 3:
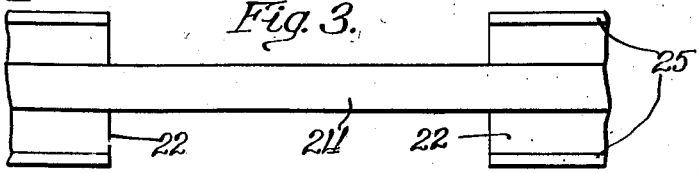
Figures 3 and 4 show the manner of constructing the walls of the freezing compartments.
Figure 4:
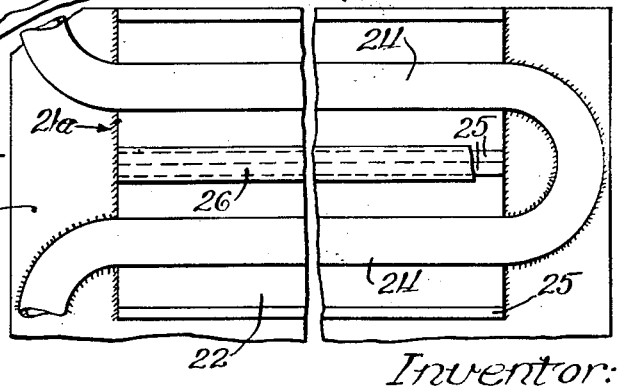

Each of the walls 21 is made up of two plates 21a and 21b. The plate 21a is formed of a plurality of sections 22, all formed integral with tubing 24 which connects the sections together. The part from which the final sections with connecting tubing are formed is produced by an extrusion or similar shaping process. Figure 3 shows the relation of the sections and tubing before they are shaped into a finished plate. To form a plate, the sections are brought into the position shown in Figure 4 with the tubing between the sections bent into loops. Along the sides of the sections are beads 25, corresponding ones of which come together along the meeting edges of the sections and over which a channel-shaped clamping strip 26 is forced under pressure to secure the sections together to form a rigid plate. The number of sections 22 making up a plate may of course be varied, a convenient number being six, as shown here. When the plate 21a is thus assembled, it is placed on the plate 21b and welded thereon as shown in Figure 4. The plate 21b extends out beyond the ends of the plate 21a, and also beyond the bends of the tubing at the ends of the plate 21a, by which the wall may be held between the annular plates 20, 20. The ends 56 and 59 of the tubing 24 are left free of the plate 21b for shaping into position for connection with the refrigerant system through the machine.

In the refrigerating process, a suitable refrigerating fluid is forced into the tubular member 12 at 49 by a pump, or fed by gravity, and from there into the bore 50 in the ends of the shaft 8. An opening 51, in shaft 8 and sleeve 10, connects bore 50 with distributing chamber 52 surrounding the sleeve 10, formed by a plate and ring assembly welded to the sleeve 10 and end plate 19. Leading from the distributing chamber 52, are a plurality of flexible tubes 54 respectively connected at 55 to one end 56 of the tubing 24 of alternate walls 21, these tubes 54 passing through openings 58 in the adjacent plate 20. The other end 59 of each tubing 24 connected to a tube 54 is connected by a flexible tube 60 to the corresponding end of tubing 24 in the next adjacent wall 21. The other end of the latter tubing 24 is connected by a flexible tube 61 to a chamber 62 similar to chamber 52, at the other end of the drum, communicating with the bore 50 in the adjacent end of shaft 8 through opening 64. The refrigerant, entering at 49, flows into chamber 52, through each pair of adjacent tubings 24 in series, into chamber 62 and is discharged therefrom through the adjacent sleeve 10, at 63. The tubes 54, 60, and 61, being flexible, accommodate circumferential displacement of the walls 21, in the operation of the apparatus. Openings 58, in plates 20 and which accommodate tubes 54 and 61 and their associated fittings, are of proper extent to permit the desired movement of the walls 21 relative to the annular end plates 20, 20.

Figure 2:
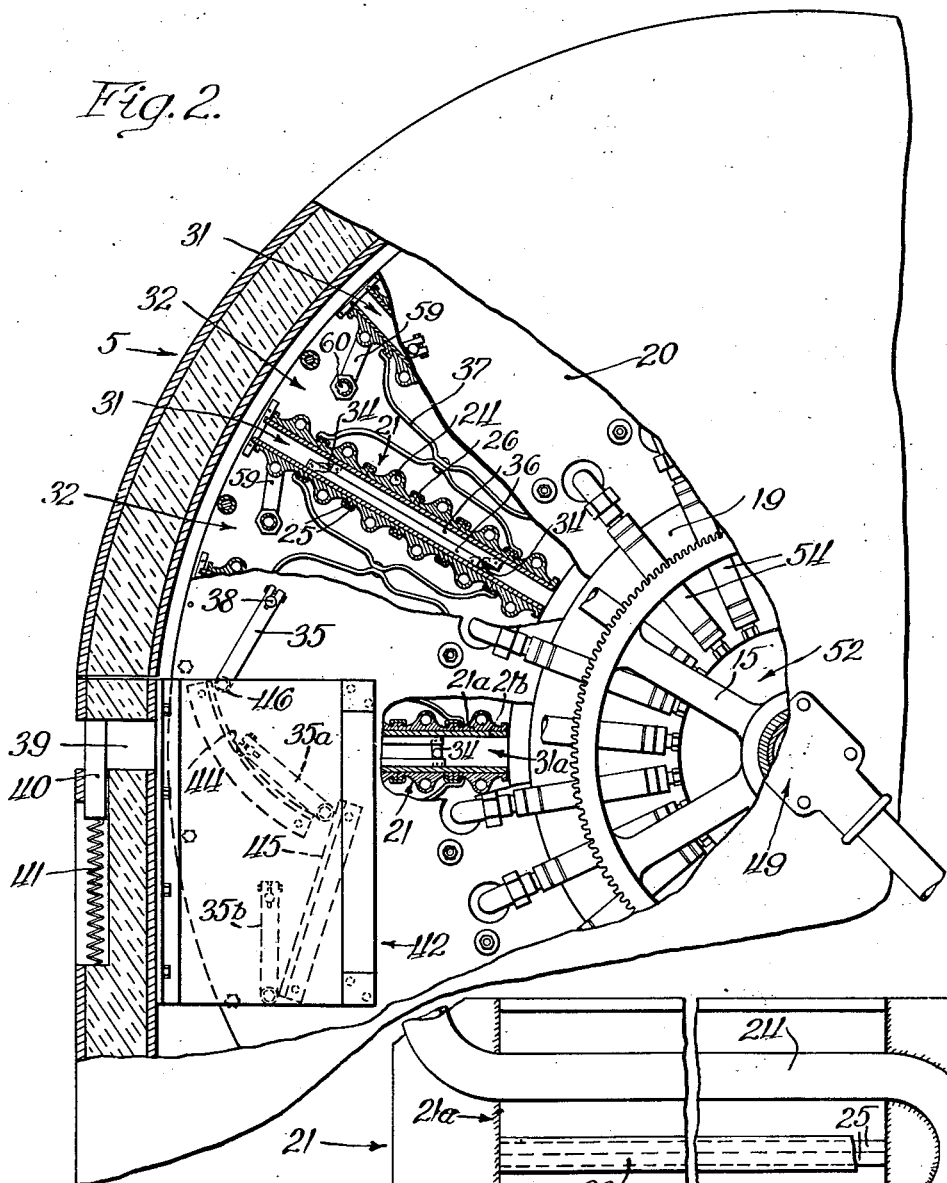
Figure 2 is a fragmentary end view, taken at right angles to Figure 1, with parts broken away and other parts in section.

In the operation of the machine, the drum is rotated counterclockwise, as viewed in Figure 2. When one of the freezing compartments 31 is in position at the opening 39 in the housing, articles to be frozen are inserted through the opening 39 into the freezing compartment, and the drum again rotated placing the next freezing compartment in position to be filled, etc., until all of the compartments are filled. A closure member 40, operated by a spring 41, normally closes the opening 39.

In order that the articles may be inserted easily into the freezing compartments, means is provided for increasing the cross-sectional area of the compartments as they reach the opening 39. This means comprises the bars 36, previously referred to, and crank arms 35, secured on the outer ends of studs 38.

Mounted on each side wall 6 of the housing, adjacent an opening 39 therein, is a plate 42 on which are mounted two angle brackets forming inclined surfaces 44 and 45. The surface 44 is located near the upper part of the plate 42 and positioned in such a manner that as the drum is rotated a roller 46 on the arm 35 engages this surface and rotates the arm 35 counterclockwise to the position shown in dotted lines at 35a. This rotates the lever 34 counterclockwise and thereby, through the bars 36, spreads the walls 21 against the tension of the springs 37, enlarging the space in the freezing compartment. The position of the walls 21, when the freezing compartment is thus enlarged, is shown at 31a. At this time the freezing compartment is opposite the opening 39 in the housing. As the drum is rotated further, the roller 46 engages the surface 45, which is placed at an angle with respect to the direction of rotation of the drum. On continued rotation of the drum, the roller 46 follows along the surface 45, turning arm 35 clockwise so that when roller 46 passes off of the lower end of surface 45 the arm 35 is in its normal position as shown at 35b. This returns the bars 36 to their normal positions permitting return of the plates 21, by the leaf springs 37, to their normal positions and restoring the freezing compartment 31 to its normal capacity.

The articles to be frozen are in flat packs, or may be placed in trays, so that they contact the flat surfaces of the walls 21 in the freezing compartments to insure efficient freezing. To limit the extent to which the trays or packs may be inserted, discs 27 are welded to the sleeves 10, 10, a short distance inwardly of the end plates 19, 19, and extend to the innermost edge of the respective walls 21. In Figure 1, a tray $t$ is shown in dot-dash lines in the position it will assume when inserted in the machine.

Expansion of the articles being frozen may spread the walls of the freezing compartment, enlarging the volumetric capacity of the compartments, this action taking place independently of the operation of the spreading bars 36.

Complete freezing of the articles is effected in one revolution of the drum. Rotation of the drum may be regulated for the varying lengths of time required for different articles.

In order to counteract or prevent formation of frost in the freezing compartments, which would cause the articles to adhere to the compartment walls in the process of freezing, or to prevent accumulation of frost inside the refrigerating apparatus at all, I provide means for the introduction of carbon dioxide into the housing. A tube 70 is located in the lower portion of the housing 5 and leads from a source of supply of carbon dioxide under pressure, with a constant pressure valve, diagrammatically indicated at 71, intervening. At the upper end of the housing a tube 72 permits escape of the carbon dioxide through a water trap 74 and a constant pressure valve, indicated diagrammatically at 75. The function of the valves 71 and 75 is to keep the pressure of the carbon dioxide within the housing 70 substantially constant, and slightly in excess of that of the outside atmosphere.

While I have shown a specific embodiment of the invention, it is to be understood that this is not limiting, but illustrative, and that various rearrangements of parts and modifications of details may be made within the scope of the present invention.

I claim:

1. In a refrigerating apparatus, a rotatable drum comprising radial walls disposed to provide freezing compartments, and means supporting said walls for limited movement in directions circumferentially of the drum.

2. In a refrigerating apparatus, a rotatable drum comprising a plurality of individual walls disposed to radiate from the drum axis and form freezing compartments, and means supporting said walls for limited movements in directions circumferentially of said drum.

3. In a refrigerating apparatus, a rotatable drum comprising a plurality of individual walls disposed to radiate from the drum axis and form freezing compartments, means restraining radial movement of said walls with respect to said drum, and means supporting said walls for limited movement in directions circumferentially of said drum.

4. In a refrigerating apparatus, a rotatable drum comprising a plurality of pairs of walls disposed parallel to and radiating from the drum axis and forming a freezing compartment between each pair of walls, the walls of each pair being movable toward and away from each other, yieldable means reacting against the outward movement of said walls, and stop means limiting the inward movement of said walls.

5. In a refrigerating apparatus, a housing and a rotatable drum comprising walls disposed parallel to and radiating from the drum axis to define a plurality of freezing compartments for the reception of articles to be frozen, and yieldable supporting means for said walls whereby the volumetric capacity of said freezing compartments can automatically be increased under the expansive action of freezing articles therein.

6. In refrigerating apparatus, a housing and a rotatable drum comprising walls defining a plurality of freezing compartments, means restraining radial movement of said walls with respect to said drum, and means operative to effect an increase in the volumetric capacity of any freezing compartment as it reaches a predetermined point in the rotation of said drum.

7. In refrigerating apparatus, a housing and a rotatable drum comprising walls defining a plurality of freezing compartments, and a spreader member disposed in each freezing compartment operative to effect an increase in the volumetric capacity of its corresponding freezing compartment as it reaches a predetermined point in the rotation of said drum.

8. In refrigerating apparatus, a housing and a rotatable drum comprising walls defining a plurality of freezing compartments, means restraining radial movement of said walls with respect to said drum, means operative to effect an increase from normal in the volumetric capacity of each freezing compartment as it reaches a predetermined point in the rotation of said drum, and means operative to return said freezing compartment to its normal capacity upon continued rotation of said drum from said predetermined point.

9. In refrigerating apparatus, a housing and a rotatable drum comprising walls defining a plurality of freezing compartments, a spreader member disposed in each of said freezing compartments, means effective to operate each spreader member as it reaches a predetermined point in the rotation of said drum, said spreader member being adapted on operation thereof to increase the volumetric capacity of said freezing compartments, and means operative to return said spreader members to their inoperative positions and thereby to return said freezing compartments to their normal capacity upon continued rotation of said drum from said predetermined point.

10. In a refrigerating apparatus, a housing, a rotatable drum mounted in said housing, said drum comprising walls defining a plurality of freezing compartments, means restraining radial movement of said walls with respect to said drum, said housing having an opening therein located to give access to said freezing compartments as the rotation of the drum brings them successively into alignment therewith, means operative to increase the volumetric capacity of the freezing compartments as they arrive at said opening, and means for bringing said freezing compartments back to their normal capacity as they leave said opening.

11. In a refrigerating apparatus, a housing, a drum mounted for rotation in said housing, said drum comprising a plurality of radially disposed walls defining freezing compartments, said walls having limited circumferential movement in said drum and being confined against radial movement therein, spreader means in each freezing compartment adapted to spread the walls forming said freezing compartments, a crank arm operatively connected with each spreader means, and cam means adapted to operate said crank for respectively increasing and decreasing the volumetric capacity of each freezing compartment as it reaches a predetermined point in the rotation of the drum.

12. In a refrigerating apparatus, a housing, a drum mounted for rotation in said housing, said drum comprising a plurality of pairs of walls forming a freezing compartment between the walls of each pair of walls, said housing having an opening for insertion of articles to be frozen into said freezing compartments, the walls of each pair being movable toward and away from each other, yieldable means for urging each pair of walls together, spreader means in each freezing compartment for moving the walls thereof outwardly, and means for operating each spreader means as the corresponding freezing compartment reaches said opening in said housing and for releasing said spreader means as said freezing compartment leaves said opening.

13. In a refrigerating apparatus, a rotatable drum comprising a series of walls disposed parallel to and radiating from the drum axis to provide a plurality of compartments, and means yieldably supporting said walls for movement toward and from each other to thereby vary the volumetric capacity of said compartments.

ANDREW JACKSON STONE.